(12) United States Patent
Kawasato et al.

(10) Patent No.: US 8,795,896 B2
(45) Date of Patent: Aug. 5, 2014

(54) LITHIUM-CONTAINING COMPOSITE OXIDE AND ITS PRODUCTION METHOD

(75) Inventors: Takeshi Kawasato, Chigasaki (JP);
Takuya Mihara, Chigasaki (JP);
Koichiro Ueda, Chigasaki (JP);
Yukimitsu Wakasugi, Chigasaki (JP);
Nozomi Honda, Chigasaki (JP)

(73) Assignee: AGC Seimi Chemical Co., Ltd., Chigasaki (JP)

( * ) Notice: Subject to any disclaimer, the term of this patent is extended or adjusted under 35 U.S.C. 154(b) by 1007 days.

(21) Appl. No.: 12/486,799

(22) Filed: Jun. 18, 2009

(65) Prior Publication Data
US 2009/0258296 A1    Oct. 15, 2009

Related U.S. Application Data

(63) Continuation of application No. PCT/JP2008/060313, filed on Jun. 4, 2008.

(30) Foreign Application Priority Data

Jun. 21, 2007 (JP) .................................. 2007-164107

(51) Int. Cl.
| H01M 4/00 | (2006.01) |
| H01M 4/36 | (2006.01) |
| H01M 4/525 | (2010.01) |
| H01M 4/131 | (2010.01) |

(52) U.S. Cl.
CPC ................ *H01M 4/36* (2013.01); *H01M 4/525* (2013.01); *H01M 4/131* (2013.01); *C01P 2004/53* (2013.01)
USPC ...................................................... 429/223

(58) Field of Classification Search
CPC ....... H01M 4/131; H01M 4/525; H01M 4/36; C01P 2004/53
USPC ...................................................... 429/223
See application file for complete search history.

(56) References Cited

U.S. PATENT DOCUMENTS

| 7,316,862 B2 * | 1/2008 | Uchitomi et al. ............. 429/128 |
| 2005/0220700 A1 * | 10/2005 | Suhara et al. .............. 423/594.4 |
| 2005/0271944 A1 | 12/2005 | Suhara et al. |
| 2007/0099087 A1 * | 5/2007 | Mihara et al. ............. 429/231.95 |
| 2009/0148772 A1 | 6/2009 | Kawasato et al. |

FOREIGN PATENT DOCUMENTS

| JP | 11-162466 | 6/1999 |
| JP | 2000/082466 | * 3/2000 |
| JP | 2003-051311 | 2/2003 |
| WO | 2004-082046 | 9/2004 |
| WO | 2005-020354 | 3/2005 |
| WO | 2005-124898 | 12/2005 |

OTHER PUBLICATIONS

Electrochimica Acta, Jun. 2006, vol. 52, p. 1483-1490.
Journal of Power Source, Sep. 2006, vol. 162, p. 629-635.

* cited by examiner

*Primary Examiner* — Milton I Cano
*Assistant Examiner* — Stephen Yanchuk
(74) *Attorney, Agent, or Firm* — Oblon, Spivak, McClelland, Maier & Neustadt, L.L.P.

(57) ABSTRACT

A lithium/nickel/cobalt/manganese-containing composite oxide powder represented by the formula $Li_pNi_xCo_yMn_zM_qO_{2-a}F_a$ (wherein M is at least one element selected from the group consisting of Al, Ge, Sn, alkaline earth metal elements and transition metal elements other than Co, Mn and Ni, $0.9 \leq p \leq 1.1$, $0.2 \leq x \leq 0.5$, $0.2 \leq y \leq 0.5$, $0.1 \leq z \leq 0.4$, $0 \leq q \leq 0.5$, $1.9 \leq a \leq 2.1$, $p+x+y+z+q=2$, and $0 \leq a \leq 0.02$), characterized in that when the powder is classified into small particle size-classified particles with an average particle size $2\ \mu m \leq D_{50} \leq 8\ \mu m$ and large particle size-classified particles with an average particle size of $10\ \mu m \leq D_{50} \leq 75\ \mu m$, the ratio of (% by weight of the small particle size-classified particles)/(% by weight of the large particle size-classified particles) is from 15/85 to 40/60.

21 Claims, No Drawings

LITHIUM-CONTAINING COMPOSITE OXIDE AND ITS PRODUCTION METHOD

TECHNICAL FIELD

The present invention relates to a process for producing a lithium/nickel/cobalt/manganese-containing composite oxide powder for a positive electrode for a lithium secondary battery, its production method, a positive electrode containing the lithium/nickel/cobalt/manganese-containing composite oxide powder for a lithium secondary battery, and a lithium secondary battery therewith.

BACKGROUND ART

Recently, as the portability and cordless tendency of instruments have progressed, a demand for a non-aqueous electrolyte secondary battery such as a lithium secondary battery which is small in size and light in weight and has a high energy density, has been increasingly high. As a cathode active material for the non-aqueous electrolyte secondary battery, a composite oxide of lithium and a transition metal or the like (which may be referred to as a "lithium-containing composite oxide" in the present specification) such as $LiCoO_2$, $LiNi_{1/3}Co_{1/3}Mn_{1/3}O_2$, $LiNiO_2$, $LiNi_{0.8}Co_{0.2}O_2$, $LiMn_2O_4$ or $LiMnO_2$, has been known.

A lithium secondary battery using a lithium/cobalt composite oxide ($LiCoO_2$) as a cathode active material and using a lithium alloy or carbon such as graphite or carbon fiber as a negative electrode, can obtain a high voltage at a level of 4 V, whereby it has been widely used as a battery having a high energy density. However, a cobalt source which is a material of the lithium/cobalt composite oxide is rare, and it is expensive. Further, in the case of the lithium secondary battery using the lithium/cobalt composite oxide as a positive electrode, it is very unstable under the charging state, it is ignitable, and its low stability is a substantial problem.

Accordingly, as the cathode active material, attention has been paid to a lithium/nickel/cobalt/manganese (Li—Ni—Co—Mn)-containing composite oxide which is not expensive, of which materials are naturally abundant elements such as manganese and which is stable under the charging state and highly safety. However, one satisfying various properties such as the discharge capacity per unit weight (which may be referred to as discharge capacity or weight capacity density in the present specification), packing property, cycle property, discharge rate property, safety and coating property relating to a coating state on a current collector, etc. at a time of producing batteries, has not been obtained.

In order to solve these problems, various studies have been made heretofore as described below.

For example, in order to improve the discharge capacity and the discharge rate property, it has been proposed to use lithium/nickel/cobalt/aluminum-containing composite oxide particles obtained by mixing a powder having a large average particle size and a powder having a small average particle size, of which compositions are the same (Patent Document 1).

Further, it has been reported that when the proportion of lithium is controlled within a range of the molar ratio of from 1.06 to 1.3 based on the total amount of nickel, cobalt and manganese contained in the lithium/nickel/cobalt/manganese-containing composite oxide, the discharge capacity and the cycle property are improved (Non-Patent Document 1 and 2).

Patent Document 1: JP-A-2003-051311 (Claim 1, pages 12 and 13)
Non-Patent Document 1: Electrochimica Acta, June 2006, vol. 52, p. 1483-1490
Non-Patent Document 2: Journal of Power Sources, September 2006, vol. 162, p. 629-635

DISCLOSURE OF THE INVENTION

Objects to be Accomplished by the Invention

When the lithium-containing composite oxide described in Patent Document 1 is used, the discharge capacity and the discharge rate property are slightly improved, however, since the discharge capacity and the discharge rate property are in a trade off relationship, a cathode active material having both a high discharge capacity and a high discharge rate property cannot be obtained. Therefore, in the case of the lithium-containing composite oxide described in Patent Document 1, a cathode active material having sufficient properties cannot be obtained.

Further, in the case of the lithium/nickel/cobalt/manganese-containing composite oxides disclosed in Non-Patent Documents 1 and 2, the discharge capacity and the cycle property are improved, however, the proportion of lithium to the total amount of nickel, cobalt and manganese contained in the composite oxide is large, and the amount of free alkalis tends to be large. In a case where a lithium/nickel/cobalt/manganese-containing composite oxide with a large amount of free alkalis is used, at a time of producing electrodes, a slurry in which the lithium/nickel/cobalt/manganese-containing composite oxide is dispersed, tends to undergo gelation, and it is thereby difficult to coat a current collector or the like with such a composite oxide, and it is difficult to process it into the electrodes.

As mentioned above, since respective properties of the positive electrode for the lithium secondary battery composed of the lithium/nickel/cobalt/manganese-containing composite oxide are in a trade-off relation, it has been very difficult to obtain a lithium/nickel/cobalt/manganese-containing composite oxide wherein the weight capacity density or the packing property is high, the cycle property, the discharge rate property and safety are excellent, the amount of free alkalis is small, and when it is dispersed to be in a slurry state, gelation does not occur.

Accordingly, it is an object of the present invention to provide a lithium/nickel/cobalt/manganese-containing composite oxide powder wherein when it is used as a positive electrode for a lithium secondary battery, the above problems can be solved, its production method, a positive electrode containing the lithium/nickel/cobalt/manganese-containing composite oxide powder for a secondary battery and a second battery containing the positive electrode.

Means to Accomplish the Object

The present inventors have been conducted extensive studies, and as a result, they have found that the above problems can be solved by the invention having the following constructions.

(1) A lithium/nickel/cobalt/manganese-containing composite oxide powder represented by the formula $Li_pNi_xCo_yMn_zM_qO_{2-a}F_a$ (wherein M is at least one element selected from the group consisting of Al, Ge, Sn, alkaline earth metal elements and transition metal elements other than Co, Mn and Ni, $0.9 \leq p \leq 1.1$, $0.2 \leq x \leq 0.5$, $0.2 \leq y \leq 0.5$, $0.1 \leq z \leq 0.4$, $0 \leq q \leq 0.05$, $1.9 \leq 2-a \leq 2.1$, $p+x+y+z+q=2$, and $0 \leq a \leq 0.02$), characterized in that when the powder is classified into small particle size-classified particles with an average particle size of 2 µm≤$D_{50}$≤8 µm and large particle size-classified particles with an average particle size of 10 µm≤$D_{50}$≤25 µm, the ratio of (% by weight of the small particle size-classified particles)/(% by weight of the large particle size-classified particles) is from 15/85 to 40/60, the molar ratio (ps) of lithium to the total of nickel, cobalt, manganese and the M element contained in the small particle size-classified particles is smaller than the molar ratio (pl) of lithium to the total of nickel, cobalt, manganese and the M element contained in the large particle size-classified particles.

(2) The lithium/nickel/cobalt/manganese-containing composite oxide powder according to the above (1), wherein 0.95≤ps≤1.04, 1.03≤pl≤1.12, and 0.85<ps/pl<1.

(3) The lithium/nickel/cobalt/manganese-containing composite oxide powder according to the above (1) or (2), wherein the specific surface area of the lithium/nickel/cobalt/manganese-containing composite oxide powder is from 0.2 to 1.0 m²/g, the specific surface area of the small particle size-classified particles is from 0.5 to 2.0 m²/g, and the specific surface area of the large particle size-classified particles is from 0.1 to 0.5 m²/g.

(4) The lithium-nickel-cobalt-manganese-containing composite oxide powder according to any one of the above (1) to (3), wherein M is at least one element selected from the group consisting of Al, Zr, Ti, Hf, Nb, Ta, Mg, Ge, Sn and Zn.

(5) The lithium/nickel/cobalt/manganese-containing composite oxide powder according to any one of the above (1) to (4), wherein the amount of free alkalis is at most 0.40 mol %.

(6) A process for producing the lithium/nickel/cobalt/manganese-containing composite oxide powder as defined in any one of the above (1) to (5), which comprises mixing a small particle size lithium-containing composite oxide powder obtained by mixing a nickel/cobalt/manganese small particle size precursor with an average particle size of 2 µm≤$D_{50}$≤8 µm and a lithium source so that the molar ratio (zs) of lithium contained in the lithium source to the total of nickel, cobalt, manganese and the M element contained in the small particle size precursor becomes from 0.95 to 1.04, followed by firing, and a large particle size lithium containing composite oxide powder obtained by mixing a nickel/cobalt/manganese large particle size precursor with an average particle size of 10 µm≤$D_{50}$≤25 µm and a lithium source so that the molar ratio (zl) of lithium contained in the lithium source to the total of nickel, cobalt, manganese and the M element contained in the large-particle-size precursor becomes from 1.03 to 1.12, and zs is smaller than zl, followed by firing, so that the ratio of (% by weight of the small particle size lithium containing composite oxide powder)/(% by weight of the large particle size lithium containing composite oxide powder) is from 15/85 to 40/60.

(7) The process for producing the lithium/nickel/cobalt/manganese-containing composite oxide powder according to the above (6), wherein the nickel/cobalt/manganese small particle size precursor or the nickel/cobalt/manganese large particle size precursor is a nickel/cobalt/manganese coprecipitated product.

(8) The process for producing the lithium/nickel/cobalt/manganese-containing composite oxide powder according to the above (7), wherein an aqueous nickel/cobalt/manganese salt solution, an aqueous alkali solution and a pH adjustor are respectively, continuously or intermittently supplied to the reaction system to carry out the reaction at the temperature of the reaction system being from 30 to 70° C., while the pH is maintained at from 10 to 13, thereby to precipitate a nickel/cobalt/manganese-containing composite hydroxide, which is used as the nickel/cobalt/manganese coprecipitated product.

(9) The process for producing the lithium/nickel/cobalt/manganese-containing composite oxide powder according to the above (6), wherein as the nickel/cobalt/manganese small particle size precursor or the nickel/cobalt/manganese large particle size precursor, a granulated powder obtained by drying granulating a slurry in which a nickel source, a cobalt source and a manganese source are dispersed, is used.

(10) The process for producing the lithium/nickel/cobalt/manganese-containing composite oxide powder according to any one of the above (6) to (9), wherein the lithium source is lithium carbonate.

(11) A lithium/nickel/cobalt/manganese-containing composite oxide powder which is produced by the process as defined in any one of Claims the above (6) to (10).

(12) A positive electrode for a lithium secondary battery comprising a cathode active material, a binder and an electroconductive material, wherein the cathode active material comprises the lithium/nickel/cobalt/manganese-containing composite oxide powder as defined in any one of the above (1) to (5) and (11).

(13) A lithium secondary battery comprising a positive electrode, a negative electrode, a non-aqueous electrolyte and an electrolytic solution, wherein the positive electrode is the one as defined in the above (12).

Effects of the Invention

The present invention provides a lithium/nickel/cobalt/manganese-containing composite oxide wherein in a case where it is used as a positive electrode for a lithium secondary battery, the weight capacity density and the packing property are high, the cycle property, the discharge rate property and safety are excellent, the amount of free alkalis is low, and gelation does not occur, when it is formed into a slurry, a process for producing the lithium/nickel/cobalt/manganese-containing composite oxide powder, a positive electrode containing the lithium/nickel/cobalt/manganese-containing composite oxide powder for a lithium secondary battery, and a lithium secondary battery containing the positive electrode.

The reason why the lithium/nickel/cobalt/manganese-containing composite oxide powder provided by the present invention has excellent properties as a positive electrode for a lithium secondary battery, as mentioned above, is not necessarily clearly understood, but is considered to be as follows.

As mentioned above, Patent Document 1 has proposed a lithium-containing composite oxide powder obtained by mixing a lithium-containing composite oxide powder having a small average particle size and a lithium-containing composite oxide powder having a large average particle size. The larger the particle size of the lithium-containing composite oxide powder is, the smaller the specific surface area is, and the less the amount of free alkalis is. However, the discharge rate property will be deteriorated because of decrease in the specific surface area and increase diffusion distance of lithium. On the contrary, as the particle size becomes smaller, the discharge rate property is improved, while since the specific surface area becomes large, the amount of free alkalis increases. Thus, since the discharge rate property and the amount of free alkalis are in a trade off relationship, the properties such as the amount of free alkalis and the discharge rate property of the lithium-containing composite oxide powder disclosed in Patent Document 1 are not satisfied.

Further, as mentioned in Non-Patent Documents 1 and 2, it has been already found that the discharge capacity and the discharge rate property can be improved by adjusting the proportion of Li to the total amount of Ni, Co and Mn contained in the lithium-containing composite oxide within the molar ratio of from 1.06 to 1.3. However, if the above proportion of Li is made to be large, the amount of free alkalis becomes high, and moisture in atmosphere tends to be absorbed. Therefore, at a time of processing the lithium-containing composite oxide into an electrode of batteries, a slurry dispersed in the lithium-containing composite oxide undergoes gelation, and the productivity of electrodes deteriorates. The mechanism of gelation is not clear, however it is considered that if excess free alkalis and moisture are present, the viscosity of slurry increases, and aggregates or the like will form.

In the case of the lithium-containing composite oxide of the present invention, in the small particle-size classified particles and the large particle size-classified particles which are obtained by classification, the molar ratio of Li to the total amount of Ni, Co, Mn and M contained in the large particle size-classified particles is higher than the molar ratio of Li to the total amount of Ni, Co, Mn and M contained in the small particle size-classified particles. Further, in the present invention, the molar ratio of Li to the total amount of Ni, Co, Mn and M contained in particles of the small particle size-classified particles or the large particle size-classified particles may sometimes be represented by "Li/(Ni+Co+Mn+M) ratio".

In the present invention, by reducing lithium contained in the small particle size-classified particles, the amount of free alkalis can be reduced, and as a result, when slurried, the slurry can be prevented from being gelled. Further, by increasing lithium contained in the large particle size-classified particles, the lithium diffusion coefficient in the particles can be improved, and the discharge capacity, the discharge rate property and the cycle property can be improved. Further, it has been found that the above-mentioned trade off relationship between the properties of cells is rare in the present invention. Thus, it is possible to obtain a lithium/nickel/cobalt/manganese-containing composite oxide wherein the weight capacity density and the packing property is high, the cycle property, the discharge rate property and safety are excellent, the amount of free alkalis is low and gelation does not occur when slurried, by properly controlling the Li/(Ni+Co+Mn+M) ratio, the content proportion and the specific surface area properly in both classified particles.

BEST MODE FOR CARRYING OUT THE INVENTION

The lithium-containing composite oxide provided by the present invention is represented by the formula $Li_pNi_xCo_yM-n_zM_qO_{2-a}F_a$. In the formula, p, x, y, z and a are as defined below. $0.9 \leq p \leq 1.1$, $0.2 \leq x \leq 0.5$, $0.2 \leq y \leq 0.5$, $0.1 \leq z \leq 0.4$, $0 \leq q \leq 0.05$, $1.9 \leq 2-a \leq 2.1$, $p+x+y+z+q=2$ and $0 \leq a \leq 0.02$. Here, when a is larger than 0, the lithium-containing composite oxide is a composite oxide wherein a part of oxygen atoms is substituted by fluorine atoms, and in such a case, the safety of the cathode active material thus obtained improves. Further, the case where a is 0, may sometimes be preferred, since the reduction of the discharge capacity is suppressed. The following p, x, y, z and a are more preferred. $0.95 \leq p \leq 1.10$, $0.25 \leq x \leq 0.40$, $0.30 \leq y \leq 0.45$, $0.20 \leq z \leq 0.35$, $0 \leq q \leq 0.03$ and $0 \leq a \leq 0.01$. Among them, q is further preferably within a range of $0.005 \leq q \leq 0.025$, particularly preferably within a range of $0.01 \leq q \leq 0.02$. When q is within the above range, the balance of various properties of cells, namely the balance of the weight capacity density, safety and the cyclic property tends to be excellent.

Further, in a case where fluorine is contained in the lithium-containing composite oxide of the present invention, the fluorine is preferably present on the surface of the lithium-containing composite oxide powder. When the fluorine is present on the surface, it is possible to improve important cell properties such as safety and the cycle property by adding a small amount of fluorine. Whether such an element is present on the surface or not, can be judged by spectral analysis of positive electrode particles. For example, it can be judged by carrying out XPS analysis (X-ray photoelectron spectroscopy).

In the above formula, the M element is at least one element selected from the group consisting of Al, Ge, Ge, alkaline earth metal elements and transition metal elements other than Co, Mn and Ni. Here, the above transition metal elements mean transition metals in Groups 4, 5, 6, 7, 8, 9, 10, 11 and 12 of Periodic Table. Among them, the M element is preferably at least one element selected from the group consisting of Al, Zr, Ti, Hf, Nb, Ta, Mg, Ge, Sn and Zn. The M element is more preferably at least one element selected from the group consisting of Al, Ti, Zr, Nb, Ge and Mg from the viewpoint of the discharge capacity, safety and the cycle property. The M element is particularly preferably at least one element selected from Al, Zr, Ti and Ge.

When the lithium-containing composite oxide powder of the present invention is classified into a powder with an average particle size $D_{50}$ of $2 \mu m \leq D_{50} \leq 8 \mu m$ (in the present invention, said powder may be referred to as small particle size-classified particles) and a powder with an average particle size $D_{50}$ of $10 \mu m \leq D_{50} \leq 25 \mu m$ (in the present invention, said powder may be referred to as large particle size-classified particles), the ratio of (% by weigh of the small particle size-classified particles)/(% by weigh of the large particle size-classified particles) is from 15/85 to 40/60. Particularly, the ratio of (% by weigh of the small particle size-classified particles)/(% by weigh of the large particle size-classified particles) is more preferably from 20/80 to 35/65. Further, in a case where the average particle sizes $D_{50}$ of the respective classified particles are within the above determined ranges, and the contents of the respective classified particles are within the predetermined ranges, particles are close-packed, voids are reduced, and the packing property of the lithium-containing composite oxide powder tends to be improved.

Further, the average particle size $D_{50}$ in the present invention means a volume-based accumulative 50% size ($D_{50}$) which is a particle size at a point of 50% on an accumulative curve when the accumulative curve is drawn so that a particle size distribution is obtained on the volume basis and the whole volume is 100%. The average particle size $D_{50}$ may be referred to simply as "the average particle size" or "$D_{50}$" in the present invention. Furthermore, "$D_{10}$" means a volume-based accumulative 10% size, and "$D_{90}$" means a volume-based accumulative 90% size. The particle size distribution is obtained from a frequency distribution and accumulative volume distribution curve measured by means of a laser scattering particle size distribution measuring apparatus. The measurement of particle sizes is conducted by measuring the particle size distribution while the powder is sufficiently dispersed in an aqueous medium by an ultrasonic treatment or the like (for example, using Microtrack HRA(X-100) manufactured by NIKKISO CO., LTD.). In a case where a lithium-containing composite oxide powder (particles) to be measured is secondary particles, the average particle size $D_{50}$ is a volume average particle size of secondary particles obtained by aggregation of primary particles one another, followed by firing. In a case where particles are only composed of primary particles, the average particle size $D_{50}$ is a volume average particle size of the primary particles.

There are no particular restrictions on the method for classifying the lithium-containing composite oxide of the present invention, and various methods are applicable. For example, the classification can be conducted by a method of letting the particles pass through a mesh represented by a sieve or the like. Furthermore, it is also possible to adopt a classification method utilizing difference in mobility by airflow. The classification can be conducted easier and precisely by this airflow classification, and a specific apparatus preferably applicable is an Elbow-Jet classification machine.

In the present invention, the ratio of Li/(Ni+Co+Mn+M) (in the present invention, it may be referred to as ps) of the small particle size-classified particles is smaller than the ratio of Li/(Ni+Co+Mn+M) (in the present invention, it may be referred to as pl) of the large particle size-classified particles. Particularly, ps and pl are preferably $0.95 \leq ps \leq 1.04$ and $1.03 \leq pl \leq 1.12$, more preferably $0.985 \leq ps \leq 1.035$ and $1.035 \leq pl \leq 1.085$. Further, $0.85 < ps/pl < 1$ is preferred, $0.90 \leq ps/pl \leq 0.99$ is more preferred, and $0.95 \leq ps/pl \leq 0.98$ is further preferred. When ps and pl are within the above ranges, the discharge capacity, the cycle property and the discharge rate property tend to be more improved. Further, for producing a large amount of the lithium-containing composite oxide powder of the present invention, production reproducibility can be further improved, and it can be efficiently produced. Further, the amount of elements contained in particles can be analyzed by an ICP analysis apparatus (Inductively Coupled Plasma Atomic Emission Spectrometer) or the like.

Further, the specific surface area of the small particle size-classified particles is preferably from 0.5 to 2.0 m²/g, more preferably from 0.7 to 1.5 m²/g, and the specific surface area of the large particle size-classified particles is preferably from 0.1 to 0.5 m²/g, more preferably from 0.2 to 0.4 m²/g.

The lithium-containing composite oxide powder of the present invention can be produced by various methods. For instance, the following method may be mentioned.

First, a mixture is obtained by mixing a nickel/cobalt/manganese-containing precursor powder with an average particle size of $2 \, \mu m \leq D_{50} \leq 8 \, \mu m$ (in the present invention, it may be referred to as nickel/cobalt/manganese small particle size precursor or small particle size precursor), a lithium source and as a case requires, an M element source and/or a fluorine source. The obtained mixture is fired under the predetermined condition to obtain a small particle size lithium-containing composite oxide powder.

Further, a mixture is obtained by mixing a nickel/cobalt/manganese-containing precursor powder with an average particle size of $10 \, \mu m \leq D_{50} \leq 25 \, \mu m$ (in the present invention, it may be referred to as nickel/cobalt/manganese large particle size precursor or large particle size precursor), a lithium source and as a case requires, an M element source and/or a fluorine source. The obtained mixture is fired under the predetermined condition to obtain a large particle size lithium-containing composite oxide powder. Further, in a case where the lithium-containing composite oxide powder of the present invention is produced by the above production method, the respective elements are mixed so that the molar ratio (zs) of lithium contained in the lithium source to the total of nickel, cobalt, manganese and the M element contained in the small particle size precursor becomes from 0.95 to 1.04, the molar ratio (zl) of lithium contained in the lithium source to the total of nickel, cobalt, manganese and the M element contained in the large particle size precursor becomes from 1.03 to 1.12, and zs is smaller than zl.

Further, the element source of the precursor to be used in the present invention is at least one member selected from the group consisting of a cobalt salt, a nickel salt, a manganese salt, a nickel/cobalt coprecipitated product, a nickel/manganese coprecipitated product, a cobalt/manganese coprecipitated product, a nickel/cobalt/manganese coprecipitated product and a nickel/cobalt/manganese/M element coprecipitated product. Examples of the cobalt salt and the nickel salt include a salt substantially insoluble in water, e.g. hydroxides, oxyhydroxides, oxides and carbonates. Specifically, in the case of cobalt, cobalt carbonate, cobalt hydroxide, cobalt oxyhydroxide or cobalt oxide is preferably used. Cobalt hydroxide or cobalt oxyhydroxide is particularly preferably used because the performance can easily be achieved. Further, in the case of nickel, nickel hydroxide, nickel oxyhydroxide, nickel oxide or nickel carbonate is preferably used. In the case of manganese, manganese hydroxide, manganese carbonate, manganese oxyhydroxide or manganese oxide is preferably used.

Further, the above nickel/cobalt coprecipitated product is preferably a nickel/cobalt coprecipitated hydroxide, a nickel/cobalt coprecipitated oxyhydroxide, a nickel/cobalt coprecipitated oxide or a nickel/cobalt coprecipitated carbonate. Further, the above nickel/cobalt/manganese coprecipitated product is preferably a nickel/cobalt/manganese coprecipitated hydroxide, a nickel/cobalt/manganese coprecipitated oxyhydroxide or a nickel/cobalt/manganese coprecipitated carbonate. Specifically, as the element source of the precursor containing nickel, cobalt and manganese, $Ni_{0.35}Co_{0.40}Mn_{0.25}OOH$, $Ni_{0.35}Co_{0.40}Mn_{0.25}(OH)_2$ or the like is preferably used.

The lithium source used in the present invention is preferably lithium carbonate or lithium hydroxide. Lithium carbonate is particularly preferred, since it is not expensive. As the fluorine source, a metal fluoride such as LiF or $MgF_2$ is used.

Further, when a coprecipitated product is used for either the small particle size precursor or the large particle size precursor, atoms such as nickel, cobalt, manganese or the M element can be uniformly exist in inside of particles. Further, coprecipitated products preferably used for both the small particle size precursor and the large particle size precursor. Further, in such a case, the content of the M element in the small particle size precursor is not necessary equal to the content of the M element in the large particle size precursor.

The above coprecipitated products can be obtained by supplying continuously or intermittently an aqueous solution in which a nickel salt, a cobalt salt, a manganese salt, the M element salt, etc. are dissolved, an aqueous alkali solution and a pH adjuster in the reaction system and reacting them to precipitate. In such a case, the temperature of the reaction system is maintained at the almost constant temperature within the range of from 30 to 70° C., preferably from 40 to 60° C., and the pH of the reaction system is maintained at the almost same value within the range of from 10 to 13, preferably from 11 to 12, whereby the reaction is preferably carried out. As the nickel salt, cobalt salt, manganese salt and the M element salt which are materials of the coprecipitated product, a sulfate, a chloride or a nitrate may be used. As the pH adjuster, ammonia, ammonium bicarbonate or the like which become a supplier of ammonium ions, may be used. As the aqueous alkali solution, an aqueous solution in which a hydroxide such as sodium hydroxide, potassium hydroxide or lithium hydroxide is dissolved may be used.

Further, in the present invention, it is possible to use a granulated powder obtained by spraying a slurry in which a nickel source, a cobalt source, a manganese source, etc. are dispersed, on the small particle size precursor or the large particle size precursor by a conventionally known method, followed by drying. In such a case, a precursor to be obtained is a finely substantially spherical secondary particle, and therefore the packing property is improved. Further, for both the small particle size precursor and the large particle size precursor, granulated powders may be used. The particle size of a granulated powder obtained after drying granulation reflects the particle sizes of the lithium-containing composite oxide powder of the present invention. Further, in a case where the lithium-containing composite oxide powder of the present invention is produced by mixing a small particle size lithium-containing composite oxide powder and a large particle size lithium-containing composite oxide powder, the average particle size of the small particle size precursor is preferably from 2 to 8 μm, and the average particle size of the large particle size precursor is preferably from 10 to 25 μm.

The lithium-containing composite oxide of the present invention can be obtained by mixing the small particle size lithium-containing composite oxide powder and the large particle size lithium-containing composite oxide powder so that the ratio of (% by weight of the small particle size lithium-containing composite oxide powder)/(% by weight of the large particle size lithium-containing composite oxide powder) becomes from 15/85 to 40/60. Further, in a case where the lithium-containing composite oxide wherein when the powder is classified, the ratio of (% by weigh of the small particle size-classified particles powder)/(% by weight of the large particle size-classified particles) becomes from 20/80 to 35/65, is produced, the ratio of (% by weigh of the small particle size lithium-containing composite oxide powder)/(% by weight of the large particle size lithium-containing composite oxide powder) is preferably from 20/80 to 35/65.

In a step of firing a mixture containing at least precursors such as the small particle precursor and the large particle precursor and a lithium source to obtain the lithium-containing composite oxide powder of the present invention, the firing is preferably carried out in an atmosphere containing oxygen under the condition of 700 to 1,050° C. If the firing temperature is lower than 700° C., a lithium-containing composite oxide is incompletely produced, while if the temperature exceeds 1,050° C., the cycle property and the discharge capacity tend to deteriorate. Particularly, the lower limit of the firing temperature is preferably 850° C., and the upper limit of the firing temperature is preferably 1,000° C. Further, the firing atmosphere is preferably an atmosphere wherein the content of oxygen is from 10 to 40 vol %.

The average particle size $D_{50}$ of the lithium-containing composite oxide powder of the present invention is preferably from 2 to 25 μm, more preferably from 8 to 20 μm, and the specific surface area is preferably from 0.2 to 1.0 $m^2/g$, more preferably from 0.3 to 0.8 $m^2/g$. Further, in the present invention, the specific surface area is measured by the BET method in all cases. The press density is preferably from 3.00 to 3.50 $g/cm^3$, more preferably from 3.20 to 3.40 $g/cm^3$. Further, in the present invention, the press density means an apparent density of a powder, when a lithium-containing composite oxide powder is pressed at a pressure of 0.33 $ton/cm^2$.

Further, the amount of free alkalis in the lithium-containing composite oxide powder of the present invention is preferably at most 0.40 mol %, more preferably at most 0.35 mol %. On the other hand, the lower limit is not particularly limited, however from the viewpoint of practical use, the lower limit is preferably 0.001 mol %.

Further, in the present invention, the amount of free alkalis is represented by a numerical value (mol %) of a percentage of the amount of alkalis eluted in water per 1 mol of the composite oxide particles, when the lithium-containing composite oxide powder is dispersed in water. The amount of free alkalis is measured as described below. First, 10 g of a powder to be measured is added in 90 g of water, and an aqueous solution to be obtained is stirred for 30 minutes to disperse a powder of a cathode active material. Next, the aqueous solution is filtrated, and an obtained filtrate is quantitative analyzed by acid-base titration using a chloric acids, whereby the amount of free alkalis can be measured.

In a case where a positive electrode for a lithium secondary battery is to be produced from the lithium-containing composite oxide powder of the present invention, the powder of the lithium-containing composite oxide is mixed with a carbon type electroconductive material such as acetylene black, graphite or Ketjenblack and a binder material. As the above binder material, polyvinylidene fluoride, polytetrafluoroethylene, polyamide, carboxymethyl cellulose or an acrylic resin may, for example, be preferably employed. The powder of the lithium-containing composite oxide of the present invention, the electroconductive material and the binder material will be formed into a slurry or a kneaded product by using a solvent or a dispersion medium. The resultant is supported on a positive electrode current collector such as an aluminum foil or a stainless steel foil by e.g. coating to form a positive electrode for a lithium secondary battery of the present invention.

In a lithium secondary battery using as the cathode active material a lithium-containing composite oxide of the present invention, a film of a porous polyethylene or a porous polypropylene may, for example, be used as a separator. Furthermore, as the solvent for the electrolytic solution of a battery, various solvents may be used. Among others, a carbonate ester is preferred. As the carbonate ester, each of a cyclic type and a chain type can be used. As the cyclic carbonate ester, propylene carbonate or ethylene carbonate (EC) may, for example, be mentioned. As the chain carbonate ester, dimethyl carbonate, diethyl carbonate (DEC), ethyl methyl carbonate (EMC), methyl propyl carbonate or methyl isopropyl carbonate may, for example, be mentioned.

In the above lithium secondary battery of the present invention, the above carbonate ester may be used alone or two or more of them may be used as mixed. Moreover, it may be used as mixed with another solvent. Furthermore, depending upon the material of the anode active material, there may be a case where the discharge capacity, the cyclic property or the charge and discharge efficiency can be improved by a combined use of a chain carbonate ester and a cyclic carbonate ester.

In the lithium secondary battery using as the cathode active material a lithium-containing composite oxide of the present invention, a gel polymer electrolyte containing a vinylidene fluoride-hexafluoropropylene copolymer (for example, KYNAR manufactured by ELF Atochem) or a vinylidene fluoride-perfluoropropyl vinyl ether copolymer may be employed. As the solute to be added to the electrolytic solvent or the polymer electrolyte, at least one member of lithium salts is preferably used, wherein e.g. $ClO_4^-$, $CF_3SO_3^-$, $BF_4^-$, $PF_6^-$, $AsF_6^-$, $SbF_6^-$, $CF_3CO_2^-$ or $(CF_3SO_2)_2N^-$ is anion. The lithium salt is preferably added in a concentration of from 0.2 to 2.0 mol/l (liter) to the electrolytic solvent or the polymer electrolyte. If the concentration departs from this range, ionic conductivity will decrease, and the electrical conductivity of the electrolyte will decrease. Among others, it is more preferably from 0.5 to 1.5 mol/l.

In the lithium battery using the lithium-containing composite oxide of the present invention as the cathode active material, as the anode active material, a material which can occlude and discharge lithium ions may be used. The material forming the anode active material is not particularly limited, however, lithium metal, a lithium alloy, a carbon material, an oxide comprising, as a main component, a metal of Group 14 or Group 15 in the Periodic Table, a carbon compound, a silicon carbide compound, a silicon oxide compound, titanium sulfide or a boron carbide compound may, for example, be mentioned. As the carbon material, one having an organic material thermally decomposed under various thermal decomposition conditions, artificial graphite, natural graphite, soil graphite, exfoliated graphite or flake graphite may, for example, be used. Further, as the oxide, a compound comprising tin oxide as a main component can be used. As the anode current collector, a copper foil or a nickel foil may, for example, be used. The negative electrode is produced preferably by kneading the anode active material with an organic solvent to form a slurry, which is coated on the metal foil current collector, dried and pressed.

There are no particular restrictions on the shape of the lithium secondary battery using the cathode active material of the present invention. The shape is selected from a sheet shape, a film shape, a folded shape, a wound cylinder with bottom, a button shape and so on, depending upon the intended purpose.

EXAMPLES

Now, the present invention will be explained in further detail with reference to Examples. However, the present invention is by no means restricted to such specific Examples.

Example 1

500 g of deionized water was added in a reactor, and stirred at 400 rpm while maintaining the temperature at 50° C. An aqueous sulfate solution containing 1.5 mol/L of nickel sulfate, 1.5 mol/L of cobalt sulfate and 1.5 mol/L of manganese sulfate and an aqueous ammonia solution were simultaneously continuously supplied thereto at a rate of 1.2 L/hr and 0.03 L/hr respectively, while 18 mol/L of an aqueous sodium hydroxide solution was supplied to the reactor to maintain the pH at 11. The liquid amount in the reaction system was controlled by an overflow method, an overflowed coprecipitated slurry was filtrated, washed with water and dried at 70° C. to obtain a nickel/cobalt/manganese-containing composite hydroxide. Particles of the obtained composite hydroxide were spherical, and their average particle size was 4 µm. Further, the ratio of nickel, cobalt and manganese contained in the composite hydroxide was Ni:Co:Mn=0.33:0.34:0.33 in molar ratio based on their total. Further, the total amount of nickel, cobalt and manganese contained in the composite hydroxide was 62.1% by weight. This composite hydroxide is referred to as small particle size precursor A.

150 g of the small particle size precursor A and 60.7 g of lithium carbonate of which the lithium content is 18.7% by weight were mixed, and the mixture was fired in air atmosphere at 990° C. for 14 hours, pulverized and mixed to obtain a substantially spherical lithium-containing composite oxide powder represented by $Li[Ni_{0.33}Co_{0.34}Mn_{0.33}]O_2$. The obtained powder had $D_{50}$ of 3.9 µm, $D_{10}$ of 2.6 µm, $D_{90}$ of 7.0 µm and a specific surface area of 0.92 m$^2$/g. This lithium-containing composite oxide powder is referred to as small particle size lithium-containing composite oxide powder A.

Further, 500 g of deionized water was added in a reactor and stirred at 400 rpm while maintaining the temperature at 50° C. An aqueous sulfate solution containing 1.5 mol/L of nickel sulfate, 1.5 mol/L of cobalt sulfate and 1.5 mol/L of manganese sulfate and an aqueous ammonia solution were simultaneously continuously supplied thereto at a rate of 1.2 L/hr and a rate of 0.03 L/hr respectively, while 18 mol/L of an aqueous sodium hydroxide solution was supplied to the reactor to maintain the pH at 11. The liquid amount in the reaction system was controlled by suction filtration through a filter, the mixture was aged at 50° C. for 24 hours, a coprecipitated slurry was filtrated and washed with water, followed by drying at 70° C. to obtain a nickel/cobalt/manganese-containing composite oxide. The obtained composite hydroxide particles were spherical, and their average particle size was 13 µm. Further, the ratio of nickel, cobalt and manganese contained in the composite hydroxide was Ni:Co:Mn=0.33:0.34:0.33 in molar ratio based on their total. Further, the total amount of nickel, cobalt and manganese contained in the composite hydroxide was 61.7% by weight. This composite hydroxide is referred to as large particle size precursor A.

150 g of the large particle size precursor A and 63.3 g of lithium carbonate of which the lithium content is 18.7% by weight were mixed, and the mixture was fired under air atmosphere at 990° C. for 14 hours, pulverized and mixed to obtain a substantially spherical lithium-containing composite oxide powder represented by $Li[Li_{0.03}(Ni_{0.33}Co_{0.34}Mn_{0.33})_{0.97}]O_2$. The obtained powder had $D_{50}$ of 12.1 µm, $D_{10}$ of 7.4 µm, $D_{90}$ of 20.1 µm, and a specific surface area of 0.22 m$^2$/g. This lithium-containing composite oxide powder is referred as large particle size lithium-containing composite oxide powder A.

The obtained small particle size lithium-containing composite oxide powder A and the obtained large particle size lithium-containing composite oxide powder A were mixed at the weight ratio of the small particle size lithium-containing composite oxide powder A:the large particle size lithium-containing composite oxide powder A=25:75 to obtain a substantially spherical lithium-containing composite oxide powder having a composition of $Li[Li_{0.03}Ni_{0.32}Co_{0.33}Mn_{0.32}]O_2$. The obtained powder had $D_{50}$ of 11.4 µm, $D_{10}$ of 8.4 µm, $D_{90}$ of 20.5 µm, and a specific surface area of 0.44 m$^2$/g. The press density of this powder was 3.30 g/cm$^3$, and the amount of free alkalis was 0.25 mol %.

The above lithium-containing composite oxide powder, acetylene black and polyvinylidene fluoride powders were mixed at a weight ratio of 90/5/5, and N-methylpyrrolidone was added to form a slurry, which was applied onto one side of aluminum foil having a thickness of 20 µm, by a doctor blade. After drying, roll pressing was carried out five times to obtain a positive electrode sheet for a lithium battery.

Then two simplified sealed cell type lithium batteries of stainless steel were assembled in an argon grove box, using a punched sheet from the positive electrode sheet as a positive electrode, a metal lithium foil having a thickness of 500 µm as a negative electrode, a nickel foil of 20 µm as a negative electrode current collector, a porous polypropylene having a thickness of 25 µm as a separator and an $LiPF_6$/EC+DEC(1:1) solution (which means a mixed solution of EC and DEC in a weight ratio (1:1) whose solute is $LiPF_6$; the same also applies to solvents mentioned hereinafter) at a concentration of 1M as an electrolyte.

One battery out of the above two was charged up to 4.3 V at a load current of 75 mA per 1 g of the cathode active material at 25° C., and discharged down to 2.5 V at a load current of 75 mA per 1 g of the cathode active material, thereby obtaining a weight capacity density in the first charge and discharge (which may be referred to as "an initial weight capacity density" in the present specification). Next, this battery was charged up to 4.3 V at a load current of 75 mA, and discharged down to 2.5 V at a load current of 113 mA, whereby a discharge capacity was obtained. Furthermore, with this battery, the charge and discharge cycle test was sequentially carried out 30 times, and a discharge capacity was obtained. As a result, the initial weight capacity density of the cathode active material at from 2.5 to 4.3 V at 25° C.

was 154 mAh/g. The high-load capacity retention obtained from the discharge capacity in the discharge at the high load of 113 mA was 93.1%, which is associated with the charge and discharge rate property. Furthermore, the capacity retention after 30 charge and discharge cycles was 99.4%.

The above lithium-containing composite oxide powder was classified into small particles and large particles at the small particle size-classified particles:the large particle size-classified particles (ratio of % by weight)=25:75 by means of an Elbow-Jet classification machine (MATSUBO-EJ-L-3 model). The small particle size-classified particles thus obtained had a specific surface area of 0.85 m$^2$/g, $D_{10}$ of 2.9 μm, $D_{50}$ of 4.5 μm and $D_{90}$ of 7.0 μm. The composition of the small particle size-classified particles was Li[Ni$_{0.33}$Co$_{0.34}$Mn$_{0.33}$]O$_2$. ps was 1.00. On the other hand, the large particle size-classified particles thus obtained had a specific surface area of 0.25 m$^2$/g, $D_{10}$ of 7.0 μm, $D_{50}$ of 11.6 μm and $D_{90}$ of 20.0 μm. The composition of the large particle size-classified particles was Li[Li$_{0.03}$Ni$_{0.32}$Co$_{0.33}$Mn$_{0.32}$]O$_2$. pl was 1.05, and ps/pl was 0.95.

Example 2: Comparative Example 150 g of the small particle size precursor A prepared in Example 1 and 62.3 g of lithium carbonate of which the lithium content is 18.7% by weight were mixed, and the mixture was fired in air atmosphere at 990° C. for 14 hours, pulverized and mixed to obtain a substantially spherical lithium-containing composite oxide powder represented by Li[Li$_{0.02}$(Ni$_{0.33}$Co$_{0.34}$Mn$_{0.33}$)$_{0.98}$]O$_2$. The obtained lithium-containing composite oxide powder had $D_{50}$ of 4.3 μm, $D_{10}$ of 2.9 μm, $D_{90}$ of 7.8 μm and a specific surface area of 0.87 m$^2$/g. This lithium-containing composite oxide powder is referred as small particle size lithium-containing composite oxide powder B.

Further, 150 g of the large particle size precursor A and 62.6 g of lithium carbonate of which the lithium content is 18.7% by weight were mixed, and the mixture was fired in air atmosphere at 990° C. for 14 hours, pulverized and mixed to obtain a substantially spherical lithium-containing composite oxide powder represented by Li[Li$_{0.02}$(Ni$_{0.33}$Co$_{0.34}$Mn$_{0.33}$)$_{0.98}$]O$_2$. The obtained powder had $D_{50}$ of 12.3 μm, $D_{10}$ of 7.4 μm, $D_{90}$ of 20.3 μm and a specific surface area of 0.27 m$^2$/g. This lithium-containing composite oxide powder is referred as large particle size lithium-containing composite oxide powder B.

The obtained small particle size lithium-containing composite oxide powder B and the obtained large particle size lithium-containing composite oxide powder B were mixed at the weight ratio of the small particle size lithium-containing composite oxide powder B:the large particle size lithium-containing composite oxide powder B=25:75 to obtain a substantially spherical lithium-containing composite oxide powder having a composition of Li[Li$_{0.02}$Ni$_{0.323}$Co$_{0.333}$Mn$_{0.324}$]O$_2$. The obtained powder had $D_{50}$ of 11.8 μm, $D_{10}$ of 7.3 μm, $D_{90}$ of 19.8 μm and a specific surface area of 0.45 m$^2$/g. This powder had a press density of 3.26 g/cm$^3$ and the amount of free alkalis of 0.36 mol %.

The above lithium-containing composite oxide powder, acetylene black and polyvinylidene fluoride powders were mixed at a weight ratio of 90/5/5, and N-methylpyrrolidone was added to form a slurry, which was applied onto one side of aluminum foil having a thickness of 20 μm, by a doctor blade. After drying, roll pressing was carried out five times to obtain a positive electrode sheet for a lithium battery.

Electrodes and batteries were prepared and evaluated in the same manner as in Example 1 except that the positive electrode sheet was one prepared using the above lithium-containing composite oxide.

As a result, the initial weight capacity density of the cathode active material at from 2.5 to 4.3 V at 25° C. was 150 mAh/g; the high-load capacity retention was 90.7%; and the capacity retention after the 30 charge and discharge cycles was 98.7%.

The above lithium-containing composite oxide powder was classified into small particles and large particles at the small particle size-classified particles:the large particle size-classified particles (ratio of % by weight)=25:75 by means of an Elbow-Jet classification machine (MATSUBO-EJ-L-3 model). The small particle size-classified particles thus obtained had a specific surface area of 0.91 m$^2$/g, $D_{10}$ of 3.0 μm, $D_{50}$ of 4.5 μm and $D_{90}$ of 7.0 μm. The composition of the small particle size-classified particles was Li[Li$_{0.02}$Ni$_{0.322}$Co$_{0.334}$Mn$_{0.324}$]O$_2$. ps was 1.04. On the other hand, the large particle size-classified particles thus obtained had a specific surface area of 0.25 m$^2$/g, $D_{10}$ of 7.3 μm, $D_{50}$ of 12.0 μm and $D_{90}$ of 20.0 μm. The composition of the large particle size-classified particles was Li[Li$_{0.02}$Ni$_{0.323}$Co$_{0.333}$Mn$_{0.324}$]O$_2$. pl was 1.04, and ps/pl was 1.00.

Example 3

150 g of the small particle size precursor A prepared in Example 1 and 60.1 g of lithium carbonate of which the lithium content is 18.7% by weight were mixed, and the mixture was fired at 990° C. in air atmosphere for 14 hours, pulverized and mixed to obtain a substantially spherical lithium-containing composite oxide powder represented by [Li$_{0.995}$(Ni$_{0.33}$Co$_{0.34}$Mn$_{0.33}$)$_{0.005}$](Ni$_{0.33}$Co$_{0.34}$Mn$_{0.33}$)O$_2$.
The obtained powder had $D_{50}$ of 4.0 μm, $D_{10}$ of 2.5 μm, $D_{90}$ of 7.5 μm and a specific surface area of 1.20 m$^2$/g. This lithium-containing composite oxide powder is referred to as small particle size lithium-containing composite oxide powder C.

Further, 150 g of the large particle size precursor A prepared in Example 1 and 63.9 g of lithium carbonate of which the lithium content is 18.7% by weight were mixed, and the mixture was fired at 990° C. in air atmosphere for 14 hours, pulverized and mixed to obtain a substantially spherical lithium-containing composite oxide powder represented by Li[Li$_{0.03}$(Ni$_{0.33}$Co$_{0.34}$Mn$_{0.33}$)$_{0.97}$]O$_2$. The obtained powder had $D_{50}$ of 13.5 μm, $D_{10}$ of 8.1 μm, $D_{90}$ of 21.3 μm and a specific surface area of 0.13 m$^2$/g. This lithium-containing composite oxide powder is referred to as large particle size lithium-containing composite oxide powder C.

The obtained small particle size lithium-containing composite oxide powder C and the obtained large particle size lithium-containing composite oxide powder C were mixed at the weight ratio of the small particle size lithium-containing composite oxide powder C:the large particle size lithium-containing composite oxide powder C=25:75 to obtain a substantially spherical lithium-containing composite oxide powder having a composition of Li[Li$_{0.021}$Ni$_{0.323}$Co$_{0.333}$Mn$_{0.323}$]O$_2$. The obtained powder had $D_{50}$ of 12.2 μm, $D_{10}$ of 7.6 μm, $D_{90}$ of 20.5 μm and a specific surface area of 0.40 m$^2$/g. The press density of the obtained powder was 3.33 g/cm$^3$, and the amount of free alkalis was 0.29 mol %.

Electrodes and batteries were prepared and evaluated in the same manner as in Example 1 except that the positive electrode sheet was one prepared using the above lithium-containing composite oxide.

As a result, the initial weight capacity density of the cathode active material at from 2.5 to 4.3 V at 25° C. was 153 mAh/g; the high-load capacity retention was 95.5%; and the capacity retention after the 30 charge and discharge cycles was 99.0%.

The above lithium-containing composite oxide powder was classified into small particles and large particles at the small particle size-classified particles:the large particle size-classified particles (ratio of % by weight)=25:75 by means of an Elbow-Jet classification machine (MATSUBO-EJ-L-3 model). The small particle size-classified particles thus obtained had a specific surface area of 1.25 m$^2$/g, $D_{10}$ of 2.4 μm, $D_{50}$ of 4.1 μm and $D_{90}$ of 7.3 μm. The composition of the small particle size-classified particles was $Li_{1.00}[Ni_{0.33}Co_{0.34}Mn_{0.33}]O_2$. ps was 1.00. On the other hand, the obtained large particle size-classified particles had a specific surface area of 0.13 m$^2$/g, $D_{10}$ of 8.0 μm, $D_{50}$ of 13.8 μm and $D_{90}$ of 21.7 μm. The composition of the large particle size classified-particles was $Li[Li_{0.03}Ni_{0.32}Co_{0.33}Mn_{0.32}]O_2$. pl was 1.06, and ps/pl was 0.94.

Example 4: Comparative Example 150 g of the small particle size precursor A prepared in Example 1 and 66.72 g of lithium carbonate of which the lithium content is 18.7% by weight were mixed, and the mixture was fired at 990° C. in air atmosphere for 14 hours, pulverized and mixed to obtain a substantially spherical lithium-containing composite oxide powder represented by $Li[Li_{0.05}(Ni_{0.33}Co_{0.34}Mn_{0.33})_{0.95}]O_2$. The obtained powder had $D_{50}$ of 5.3 μm, $D_{10}$ of 3.8 μm, $D_{90}$ of 9.6 μm and a specific surface area of 0.60 m$^2$/g. This lithium-containing composite oxide powder is referred to as small particle size lithium-containing composite oxide powder D.

Further, 150 g of the large particle size precursor A prepared in Example 1 and 62.1 g of lithium carbonate of which the lithium content is 18.7% by weight were mixed, and the mixture was fired at 990° C. in air atmosphere for 14 hours, pulverized and mixed to obtain a substantially spherical lithium-containing composite oxide powder represented by $Li[Li_{0.02}(Ni_{0.33}Co_{0.34}Mn_{0.33})_{0.98}]O_2$. The obtained powder had $D_{50}$ of 11.5 μm, $D_{10}$ of 7.0 μm, $D_{90}$ of 19.6 μm and a specific surface area of 0.35 m$^2$/g. This lithium-containing composite oxide powder is referred to as large particle size lithium-containing composite oxide powder D.

The obtained small particle size lithium-containing composite oxide powder D and the obtained large particle size lithium-containing composite oxide powder D were mixed at the weight ratio of the obtained small particle size lithium-containing composite oxide powder D:the large particle size lithium-containing composite oxide powder D=25:75 to obtain a substantially spherical lithium-containing composite oxide powder having a composition of $Li[Li_{0.03}Ni_{0.32}Co_{0.33}Mn_{0.32}]O_2$. The obtained powder had $D_{50}$ of 11.0 μm, $D_{10}$ of 6.5 μm, $D_{90}$ of 19.1 μm and a specific surface area of 0.40 m$^2$/g. The press density of the powder was 3.15 g/cm$^3$, and the amount of free alkalis was 0.53 mol %.

Electrodes and batteries were prepared and evaluated in the same manner as in Example 1 except that the positive electrode sheet was one prepared using the above lithium-containing composite oxide.

As a result, the initial weight capacity density of the cathode active material at from 2.5 to 4.3 V at 25° C. was 147 mAh/g; the high-load capacity retention was 88.9%; and the capacity retention after the 30 charge and discharge cycles was 96.7%.

The above lithium-containing composite oxide powder was classified into small particles and large particles at the small particle size-classified particles:the large particle size-classified particles (ratio of % by weight)=25:75 by means of an Elbow-Jet classification machine (MATSUBO-EJ-L-3 model). The small particle size-classified particles thus obtained had a specific surface area of 0.67 m$^2$/g, $D_{10}$ of 3.4 μm, $D_{50}$ of 5.0 μm and $D_{90}$ of 9.3 μm. The composition of the small particle size-classified particles was $Li[Li_{0.05}Ni_{0.314}Co_{0.323}Mn_{0.313}]O_2$. ps was 1.11. On the other hand, the obtained large particle size-classified particles had a specific surface area of 0.34 m$^2$/g, $D_{10}$ of 7.3 μm, $D_{50}$ of 11.3 μm and $D_{90}$ of 19.9 μm. The composition of the large particle size-classified particles was $Li[Li_{0.02}Ni_{0.323}Co_{0.334}Mn_{0.323}]O_2$. pl was 1.04, and ps/pl was 1.06.

Example 5

500 g of deionized water was added in a reactor and stirred at 400 rpm while maintaining the temperature at 50° C. An aqueous sulfate solution containing 1.5 mol/L of nickel sulfate, 1.7 mol/L of cobalt sulfate and 1.1 mol/L of manganese sulfate and an aqueous ammonia solution were simultaneously continuously supplied thereto at a rate of 1.2 L/hr and a rate of 0.03 L/hr respectively, while supplying 18 mol/L of an aqueous sodium hydroxide solution to maintain the pH in the reactor at 11. The liquid amount in the reaction system was controlled by an overflow method, an overflowed coprecipitated slurry was filtrated and washed with water followed by drying at 70° C. to obtain a nickel/cobalt/manganese-containing composite hydroxide. The obtained composite hydroxide particles were spherical, and their average particle size was 3.4 μm. Further, the ratio of nickel, cobalt and manganese contained in the composite hydroxide was Ni:Co:Mn=0.35:0.40:0.25 in molar ratio based on their total. Further, the total amount of nickel, cobalt and manganese contained in the composite hydroxide was 61.4% by weight. This composite hydroxide is referred to as small particle size precursor B.

150 g of the small particle size precursor B and 60.0 g of lithium carbonate of which the lithium content is 18.7% by weight were mixed, the mixture was fired in air atmosphere at 950° C. for 14 hours, pulverized and mixed to obtain a substantially spherical lithium-containing composite oxide powder represented by $Li[Ni_{0.35}Co_{0.40}Mn_{0.25}]O_2$. The obtained powder has $D_{50}$ of 3.6 μm, $D_{10}$ of 2.3 μm, $D_{90}$ of 6.9 μm and a specific surface area of 1.20 m$^2$/g. This lithium-containing composite oxide powder is referred as small particle size lithium-containing composite oxide powder E.

Further, 500 g of deionized water was added in a reactor and stirred at 400 rpm while maintaining the temperature at 50° C. An aqueous sulfate solution containing 1.5 mol/L of nickel sulfate, 1.7 mol/L of cobalt sulfate and 1.1 mol/L of manganese sulfate and an aqueous ammonia solution were simultaneously continuously supplied thereto at a rate of 1.2 L/hr and a rate of 0.03 L/hr respectively, while supplying 18 mol/L of an aqueous sodium hydroxide solution to maintain the pH in the reactor at 11. The liquid amount in the reaction system was controlled by suction filtration through a filter, the mixture was aged at 50° C. for 24 hours, and then a coprecipitated slurry was filtrated and washed with water followed by drying at 70° C. to obtain a nickel/cobalt/manganese-containing composite hydroxide. The obtained composite hydroxide particles were spherical, and the average particle size was 12.4 μm. Further, the ratio of the total of nickel, cobalt and manganese contained in the composite hydroxide was Ni:Co:Mn=0.35:0.40:0.25 in molar ratio based on their total. Further, the total amount of nickel, cobalt and manganese contained in the composite hydroxide was 61.9% by weight. This composite hydroxide is referred to as the large particle size precursor B.

150 g of the large particle size precursor B and 63.3 g of lithium carbonate of which the lithium content is 18.7% by weight were mixed, and the mixture was fired in air atmosphere at 950° C. for 14 hours, pulverized and mixed to obtain a substantially spherical lithium-containing composite oxide powder represented by $Li[Li_{0.04}(Ni_{0.35}Co_{0.40}Mn_{0.25})_{0.96}]O_2$. The obtained powder had $D_{50}$ of 12.5 μm, $D_{10}$ of 7.6 μm, $D_{90}$ of 20.8 μm and a specific surface area of 0.25 m$^2$/g. This lithium-containing composite oxide powder is referred as large particle size lithium-containing composite oxide powder E.

The obtained small particle size lithium-containing composite oxide powder E and the obtained large particle size lithium-containing composite oxide powder E were mixed at the weight ratio of the small particle size lithium-containing composite oxide powder E:the large particle size lithium-containing composite oxide powder E=25:75 to obtain a substantially spherical lithium-containing composite oxide powder having a composition of $Li[Li_{0.03}Ni_{0.34}Co_{0.388}Mn_{0.243}]O_2$. The obtained powder had $D_{50}$ of 10.9 μm, $D_{10}$ of 6.3 μm, $D_{90}$ of 19.1 μm and a specific surface area of 0.50 m$^2$/g. The press density of this powder was 3.40 g/cm$^3$, the amount of free alkalis was 0.35 mol %.

Electrodes and batteries were prepared and evaluated in the same manner as in Example 1 except that the positive electrode sheet was one prepared using the above lithium-containing composite oxide.

As a result, the initial weight capacity density of the cathode active material at from 2.5 to 4.3 V at 25° C. was 160 mAh/g; the high-load capacity retention was 95.3%; and the capacity retention after the 30 charge and discharge cycles was 99.2%.

The above lithium-containing composite oxide powder was classified into small particles and large particles at the small particle size-classified particles:the large particle size-classified particles (ratio of % by weight)=25:75 by means of an Elbow-Jet classification machine (MATSUBO-EJ-L-3 model). The small particle size-classified particles thus obtained had a specific surface area of 1.28 m$^2$/g, $D_{10}$ of 2.3 μm, $D_{50}$ of 3.5 μm and $D_{90}$ of 6.6 μm. The composition of the small particle size-classified particles was $Li[Ni_{0.35}Co_{0.40}Mn_{0.25}]O_2$. ps was 1.00. On the other hand, the obtained large particle size-classified particles had a specific surface area of 0.24 m$^2$/g, $D_{10}$ of 7.6 μm, $D_{50}$ of 12.5 μm and $D_{90}$ of 20.5 μm. The composition of the large particle size-classified particles was $Li[Li_{0.04}Ni_{0.336}Co_{0.384}Mn_{0.24}]O_2$. pl was 1.08, and ps/pl was 0.92.

Example 6: Comparative Example 150 g of the small particle size precursor B prepared in Example 5 and 63.6 g of lithium carbonate of which the lithium content is 18.7% by weight were mixed, and the mixture was fired at 950° C. in air atmosphere for 14 hours to obtain a substantially spherical lithium-containing composite oxide powder represented by $Li[Li_{0.03}(Ni_{0.35}Co_{0.40}Mn_{0.25})_{0.97}]O_2$. The obtained powder had $D_{50}$ of 4.1 μm, $D_{10}$ of 3.2 μm, $D_{90}$ of 7.8 μm and a specific surface area of 0.80 m$^2$/g. This lithium-containing composite oxide powder is referred to as small particle size lithium-containing composite oxide powder F.

Further, 150 g of the large particle size precursor B prepared in Example 5 and 64.1 g of lithium carbonate of which the lithium content is 18.7% by weight were mixed, and the mixture was fired at 990° C. in air atmosphere for 14 hours to obtain a substantially spherical lithium-containing composite oxide powder represented by $Li[Li_{0.03}(Ni_{0.35}Co_{0.40}Mn_{0.25})_{0.97}]O_2$. The obtained powder had $D_{50}$ of 12.3 μm, $D_{10}$ of 7.5 μm, $D_{90}$ of 20.1 μm and a specific surface area of 0.30 m$^2$/g. This lithium-containing composite oxide powder is referred to as large particle size lithium-containing composite oxide powder F.

The obtained small particle size lithium-containing composite oxide powder F and the obtained large particle size lithium-containing composite oxide powder F were mixed at the weight ratio of the obtained small particle size lithium-containing composite oxide powder F:the large particle size lithium-containing composite oxide powder F=25:75 to obtain a substantially spherical lithium-containing composite oxide powder having a composition of $Li[Li_{0.03}Ni_{0.34}Co_{0.388}Mn_{0.242}]O_2$. The obtained powder had $D_{50}$ of 11.3 μm, $D_{10}$ of 6.8 μm, $D_{90}$ of 19.3 μm and a specific surface area of 0.43 m$^2$/g. The press density of the obtained powder was 3.34 g/cm$^3$, and the amount of free alkalis was 0.49 mol %.

Electrodes and batteries were prepared and evaluated in the same manner as in Example 1 except that the positive electrode sheet was one prepared using the above lithium-containing composite oxide.

As a result, the initial weight capacity density of the cathode active material at from 2.5 to 4.3 V at 25° C. was 158 mAh/g; the high-load capacity retention was 92.1%; and the capacity retention after the 30 charge and discharge cycles was 98.0%.

The above lithium-containing composite oxide powder was classified into small particles and large particles at the small particle size-classified particles:the large particle size-classified particles (ratio of % by weight)=25:75 by means of an Elbow-Jet classification machine (MATSUBO-EJ-L-3 model). The small particle size-classified particles thus obtained had a specific surface area of 0.87 m$^2$/g, $D_{10}$ of 3.0 μm, $D_{50}$ of 4.2 μm and $D_{90}$ of 7.4 μm. The composition of the small particle size-classified particles was $Li[Li_{0.03}Ni_{0.34}Co_{0.387}Mn_{0.243}]O_2$. ps was 1.06. On the other hand, the obtained large particle size-classified particles had a specific surface area of 0.29 m$^2$/g, $D_{10}$ of 7.7 μm, $D_{50}$ of 12.3 μm and $D_{90}$ of 20.0 μm. The composition of the large particle size-classified particles was $Li[Li_{0.03}Ni_{0.34}Co_{0.388}Mn_{0.242}]O_2$. pl was 1.06, and ps/pl was 1.00.

Example 7: Comparative Example 75 g of the small particle size precursor B prepared in Example 5, 75 g of the large particle size precursor B prepared in Example 5 and 64.0 g of lithium carbonate of which the lithium content is 18.7% by weight were mixed, and the mixture was fired at 950° C. in air atmosphere for 14 hours, pulverized and mixed to obtain a substantially spherical lithium-containing composite oxide powder represented by $Li[Li_{0.03}Ni_{0.34}Co_{0.388}Mn_{0.242}]O_2$. The obtained powder had $D_{50}$ of 11.5 μm, $D_{10}$ of 6.9 μm, $D_{90}$ of 20.0 μm and a specific surface area of 0.41 m$^2$/g. The press density of the obtained powder was 3.24 g/cm$^3$, and the amount of free alkalis was 0.60 mol %.

Electrodes and batteries were prepared and evaluated in the same manner as in Example 1 except that the positive electrode sheet was one prepared using the above lithium-containing composite oxide.

As a result, the initial weight capacity density of the cathode active material at from 2.5 to 4.3 V at 25° C. was 157 mAh/g; the high-load capacity retention was 89.7%; and the capacity retention after the 30 charge and discharge cycles was 94.3%.

The above lithium-containing composite oxide powder was classified into small particles and large particles at the small particle size-classified particles:the large particle size-classified particles (ratio of % by weight)=25:75 by means of an Elbow-Jet classification machine (MATSUBO-EJ-L-3 model). The small particle size-classified particles thus obtained had a specific surface area of 0.63 m$^2$/g, $D_{10}$ of 3.6 μm, $D_{50}$ of 4.4 μm and $D_{90}$ of 8.1 μm. The composition of the small particle size-classified particles was Li[Li$_{0.04}$Ni$_{0.336}$Co$_{0.382}$Mn$_{0.242}$]O$_2$. ps was 1.08. On the other hand, the obtained large particle size-classified particles had a specific surface area of 0.40 m$^2$/g, $D_{10}$ of 6.9 μm, $D_{50}$ of 11.5 μm and $D_{90}$ of 20.0 μm. The composition of the large particle size-classified particles was Li[Li$_{0.02}$Ni$_{0.342}$Co$_{0.392}$Mn$_{0.246}$]O$_2$. pl was 1.04, and ps/pl was 1.04.

Example 8

150 g of the small particle size precursor A prepared in Example 1 and 62.5 g of lithium carbonate of which the lithium content is 18.7% by weight were mixed, and the mixture was fired at 950° C. in air atmosphere for 14 hours, pulverized and mixed to obtain a substantially spherical lithium-containing composite oxide powder represented by Li[Li$_{0.015}$(Ni$_{0.33}$Co$_{0.34}$Mn$_{0.33}$)$_{0.985}$]O$_2$. The obtained powder had $D_{50}$ of 3.9 μm, $D_{10}$ of 2.6 μm, $D_{90}$ of 7.1 μm and a specific surface area of 1.20 m$^2$/g. This lithium-containing composite oxide powder is referred to as small particle size lithium-containing composite oxide powder G.

Further, 150 g of the large particle size precursor B prepared in Example 5 and 63.5 g of lithium carbonate of which the lithium content is 18.7% by weight were mixed, and the mixture was fired at 950° C. in air atmosphere for 14 hours, pulverized and mixed to obtain a substantially spherical lithium-containing composite oxide powder represented by Li[Li$_{0.025}$(Ni$_{0.35}$Co$_{0.40}$Mn$_{0.25}$)$_{0.975}$]O$_2$. The obtained powder had $D_{50}$ of 12.1 μm, $D_{10}$ of 7.3 μm, $D_{90}$ of 19.9 μm and a specific surface area of 0.40 m$^2$/g. This lithium-containing composite oxide powder is referred to as large particle size lithium-containing composite oxide powder G.

The obtained small particle size lithium-containing composite oxide powder G and the obtained large particle size lithium-containing composite oxide powder G were mixed at the weight ratio of the obtained small particle size lithium-containing composite oxide powder G:the large particle size lithium-containing composite oxide powder G=25:75 to obtain a substantially spherical lithium-containing composite oxide powder having a composition of Li[Li$_{0.02}$Ni$_{0.337}$Co$_{0.377}$Mn$_{0.266}$]O$_2$. The obtained powder had $D_{50}$ of 12.1 μm, $D_{10}$ of 7.3 μm, $D_{90}$ of 19.9 μm and a specific surface area of 0.56 m$^2$/g. The press density of the obtained powder was 3.36 g/cm$^3$, and the amount of free alkalis was 0.39 mol %.

Electrodes and batteries were prepared and evaluated in the same manner as in Example 1 except that the positive electrode sheet was one prepared using the above lithium-containing composite oxide.

As a result, the initial weight capacity density of the cathode active material at from 2.5 to 4.3 V at 25° C. was 161 mAh/g; the high-load capacity retention was 94.7%; and the capacity retention after the 30 charge and discharge cycles was 99.0%.

The above lithium-containing composite oxide powder was classified into small particles and large particles at the small particle size-classified particles:the large particle size-classified particles (ratio of % by weight)=25:75 by means of an Elbow-Jet classification machine (MATSUBO-EJ-L-3 model). The small particle size-classified particles thus obtained had a specific surface area of 1.26 m$^2$/g, $D_{10}$ of 2.4 μm, $D_{50}$ of 3.8 μm and $D_{90}$ of 7.0 μm. The composition of the small particle size-classified particles was Li[Li$_{0.01}$Ni$_{0.325}$Co$_{0.34}$Mn$_{0.325}$]O$_2$. ps was 1.02. On the other hand, the obtained large particle size-classified particles had a specific surface area of 0.39 m$^2$/g, $D_{10}$ of 7.5 μm, $D_{50}$ of 12.3 μm and $D_{90}$ of 20.0 μm. The composition of the large particle size-classified particles was Li[Li$_{0.02}$Ni$_{0.34}$Co$_{0.39}$Mn$_{0.25}$]O$_2$. pl was 1.04, and ps/pl was 0.98.

Example 9: Comparative Example 75 g of the small particle size precursor A prepared in Example 1, 75 g of the large particle size precursor B prepared in Example 5 and 63.3 g of lithium carbonate of which the lithium content is 18.7% by weight were mixed, and the mixture was fired at 950° C. in air atmosphere for 14 hours, pulverized and mixed to obtain a substantially spherical lithium-containing composite oxide powder represented by Li[Li$_{0.025}$Ni$_{0.336}$Co$_{0.375}$Mn$_{0.264}$]O$_2$. The obtained powder had $D_{50}$ of 11.7 μm, $D_{10}$ of 6.9 μm, $D_{90}$ of 19.9 μm and a specific surface area of 0.45 m$^2$/g. The press density of the obtained powder was 3.20 g/cm$^3$, and the amount of free alkalis was 0.56 mol %.

Electrodes and batteries were prepared and evaluated in the same manner as in Example 1 except that the positive electrode sheet was one prepared using the above lithium-containing composite oxide.

As a result, the initial weight capacity density of the cathode active material at from 2.5 to 4.3 V at 25° C. was 160 mAh/g; the high-load capacity retention was 90.6%; and the capacity retention after the 30 charge and discharge cycles was 96.2%.

The above lithium-containing composite oxide powder was classified into small particles and large particles at the small particle size-classified particles:the large particle size-classified particles (ratio of % by weight)=25:75 by means of an Elbow-Jet classification machine (MATSUBO-EJ-L-3 model). The small particle size-classified particles thus obtained had a specific surface area of 0.93 m$^2$/g, $D_{10}$ of 3.0 μm, $D_{50}$ of 4.3 μm and $D_{90}$ of 7.5 μm. The composition of the small particle size-classified particles was Li[Li$_{0.03}$Ni$_{0.32}$Co$_{0.33}$Mn$_{0.32}$]O$_2$. ps was 1.06. On the other hand, the obtained large particle size-classified particles had a specific surface area of 0.26 m$^2$/g, $D_{10}$ of 7.3 μm, $D_{50}$ of 12.1 μm and $D_{90}$ of 19.9 μm. The composition of the large particle size-classified particles was Li[Li$_{0.02}$Ni$_{0.34}$Co$_{0.39}$Mn$_{0.25}$]O$_2$. pl was 1.04, and ps/pl was 1.02.

Example 10

148.4 g of the small particle size precursor A prepared in Example 1, 60.7 g of lithium carbonate of which the lithium content is 18.7% by weight, 1.3 g of aluminum hydroxide and 0.2 g of zirconium oxide were mixed, and the mixture was fired at 990° C. in air atmosphere for 14 hours, pulverized and mixed to obtain a substantially spherical lithium-containing composite oxide powder represented by [Li(Ni$_{0.33}$Co$_{0.34}$Mn$_{0.33}$)$_{0.989}$Al$_{0.01}$Zr$_{0.001}$]O$_2$. The obtained powder had $D_{50}$ of 2.3 μm, $D_{10}$ of 3.7 μm, $D_{90}$ of 6.9 μm and a specific surface area of 0.95 m$^2$/g. This lithium-containing composite oxide powder is referred to as small particle size lithium-containing composite oxide powder H.

Further, 150 g of the large particle size precursor A prepared in Example 1, 63.3 g of lithium carbonate of which the lithium content is 18.7% by weight, 1.3 g of aluminum hydroxide and 0.2 g of zirconium oxide were mixed, and the mixture was fired at 990° C. in air atmosphere for 14 hours, pulverized and mixed to obtain a substantially spherical lithium-containing composite oxide powder represented by Li[Li$_{0.025}$((Ni$_{0.33}$Co$_{0.34}$Mn$_{0.33}$)$_{0.989}$Al$_{0.01}$Zr$_{0.001}$)$_{0.975}$]O$_2$. The obtained powder had D$_{50}$ of 11.7 μm, D$_{10}$ of 7.1 μm, D$_{90}$ of 19.3 μm and a specific surface area of 0.25 m$^2$/g. This lithium-containing composite oxide powder is referred to as large particle size lithium-containing composite oxide powder H.

The obtained small particle size lithium-containing composite oxide powder H and the obtained large particle size lithium-containing composite oxide powder H were mixed at the weight ratio of the small particle size lithium-containing composite oxide powder H:the large particle size lithium-containing composite oxide powder H=25:75 to obtain a substantially spherical lithium-containing composite oxide powder having a composition of Li[Li$_{0.019}$Ni$_{0.32}$Co$_{0.33}$Mn$_{0.32}$Al$_{0.01}$Zr$_{0.001}$]O$_2$. The obtained powder had D$_{50}$ of 11.0 μm, D$_{10}$ of 6.9 μm, D$_{90}$ of 19.0 μm and a specific surface area of 0.48 m$^2$/g. The press density of the obtained powder was 3.26 g/cm$^3$, and the amount of free alkalis was 0.23 mol %.

Electrodes and batteries were prepared and evaluated in the same manner as in Example 1 except that the positive electrode sheet was one prepared using the above lithium-containing composite oxide.

As a result, the initial weight capacity density of the cathode active material at from 2.5 to 4.3 V at 25° C. was 151 mAh/g; the high-load capacity retention was 94.5%; and the capacity retention after the 30 charge and discharge cycles was 99.1%.

The above lithium-containing composite oxide powder was classified into small particles and large particles at the small particle size-classified particles:the large particle size-classified particles (ratio of % by weight)=25:75 by means of an Elbow-Jet classification machine (MATSUBO-EJ-L-3 model). The small particle size-classified particles thus obtained had a specific surface area of 0.95 m$^2$/g, D$_{10}$ of 2.3 μm, D$_{50}$ of 3.7 μm and D$_{90}$ of 6.9 μm. The composition of the small particle size-classified particles was Li[Ni$_{0.329}$Co$_{0.34}$Mn$_{0.32}$Al$_{0.01}$Zr$_{0.001}$]O$_2$. ps was 1.00. On the other hand, the obtained large particle size-classified particles had a specific surface area of 0.25 m$^2$/g, D$_{10}$ of 7.1 μm, D$_{50}$ of 11.7 μm and D$_{90}$ of 19.3 μm. The composition of the large particle size-classified particles was Li[Li$_{0.025}$Ni$_{0.318}$Co$_{0.328}$Mn$_{0.318}$Al$_{0.01}$Zr$_{0.001}$]O$_2$. pl was 1.05, and ps/pl was 0.95.

Example 11

The small particle size lithium-containing composite oxide powder C produced in Example 3 and the large particle size lithium-containing composite oxide powder C produced in Example 3 were mixed at the weight ratio of the small particle size lithium-containing composite oxide powder C:the large particle size lithium-containing composite oxide powder C=15:85 to obtain a substantially spherical lithium-containing composite oxide powder having a composition of Li[Li$_{0.025}$Ni$_{0.322}$Co$_{0.331}$Mn$_{0.322}$]O$_2$. The obtained powder had D$_{50}$ of 12.1 μm, D$_{10}$ of 7.3 μm, D$_{90}$ of 19.9 μm and a specific surface area of 0.30 m$^2$/g. The press density of the obtained powder was 3.22 g/cm$^3$, and the amount of free alkalis was 0.26 mol %.

Electrodes and batteries were prepared and evaluated in the same manner as in Example 1 except that the positive electrode sheet was one prepared using the above lithium-containing composite oxide.

As a result, the initial weight capacity density of the cathode active material at from 2.5 to 4.3 V at 25° C. was 150 mAh/g; the high-load capacity retention was 94.7%; and the capacity retention after the 30 charge and discharge cycles was 99.4%.

The above lithium-containing composite oxide powder was classified into small particles and large particles at the small particle size-classified particles:the large particle size-classified particles (ratio of % by weight)=25:75 by means of an Elbow-Jet classification machine (MATSUBO-EJ-L-3 model). The small particle size-classified particles thus obtained had a specific surface area of 0.95 m$^2$/g, D$_{10}$ of 3.1 μm, D$_{50}$ of 4.8 μm and D$_{90}$ of 9.0 μm. The composition of the small particle size-classified particles was Li[Ni$_{0.33}$Co$_{0.34}$Mn$_{0.33}$]O$_2$. ps was 1.00. On the other hand, the obtained large particle size-classified particles had a specific surface area of 0.11 m$^2$/g, D$_{10}$ of 8.7 μm, D$_{50}$ of 14.5 μm and D$_{90}$ of 22.6 μm. The composition of the large particle size-classified particles was Li[Li$_{0.025}$Ni$_{0.322}$Co$_{0.331}$Mn$_{0.322}$]O$_2$. pl was 1.05, and ps/pl was 0.95.

Example 12

The small particle size lithium-containing composite oxide powder E produced in Example 5 and the large particle size lithium-containing composite oxide powder E produced in Example 5 were mixed at the weight ratio of the small particle size lithium-containing composite oxide powder E:the large particle size lithium-containing composite oxide powder E=35:65 to obtain a substantially spherical lithium-containing composite oxide powder having a composition of Li[Li$_{0.025}$Ni$_{0.341}$Co$_{0.390}$Mn$_{0.244}$]O$_2$. The obtained powder had D$_{50}$ of 9.5 μm, D$_{10}$ of 5.7 μm, D$_{90}$ of 15.9 μm and a specific surface area of 0.60 m$^2$/g. The press density of the obtained powder was 3.33 g/cm$^3$, and the amount of free alkalis was 0.39 mol %.

Electrodes and batteries were prepared and evaluated in the same manner as in Example 1 except that the positive electrode sheet was one prepared using the above lithium-containing composite oxide.

As a result, the initial weight capacity density of the cathode active material at from 2.5 to 4.3 V at 25° C. was 163 mAh/g; the high-load capacity retention was 96.4%; and the capacity retention after the 30 charge and discharge cycles was 98.5%.

The above lithium-containing composite oxide powder was classified into small particles and large particles at the small particle size-classified particles:the large particle size-classified particles (ratio of % by weight)=25:75 by means of an Elbow-Jet classification machine (MATSUBO-EJ-L-3 model). The small particle size-classified particles thus obtained had a specific surface area of 1.47 m$^2$/g, D$_{10}$ of 2.0 μm, D$_{50}$ of 3.1 μm and D$_{90}$ of 6.3 μm. The composition of the small particle size-classified particles was Li[Ni$_{0.35}$Co$_{0.40}$Mn$_{0.25}$]O$_2$. ps was 1.00. On the other hand, the obtained large particle size-classified particles had a specific surface area of 0.31 m$^2$/g, D$_{10}$ of 6.9 μm, D$_{50}$ of 11.6 μm and D$_{90}$ of 19.1 μm. The composition of the large particle size-classified particles was Li[Li$_{0.035}$Ni$_{0.338}$Co$_{0.386}$Mn$_{0.241}$]O$_2$. pl was 1.07, and ps/pl was 0.93.

INDUSTRIAL APPLICABILITY

The present invention provides a positive electrode for a lithium secondary battery, which has a large volume capacity density, high safety and an excellent cycle property and which further has an excellent discharge rate property, and a lithium secondary battery using the positive electrode. Furthermore, a lithium-containing composite oxide powder used as a material for the above positive electrode for the lithium secondary battery is produced by the production process of the present invention. They are useful in the field of lithium secondary battery and their applicability is extremely high in this field.

The entire disclosure of Japanese Patent Application No. 2007-164107 filed on Jun. 21, 2007 including specification, claims and summary is incorporated herein by reference in its entirety.

What is claimed is:

1. A lithium/nickel/cobalt/manganese-containing composite oxide powder represented by the formula $Li_pNi_xCo_yMn_zM_qO_{2-a}F_a$ wherein M is at least one element selected from the group consisting of Al, Ge, Sn, alkaline earth metal elements and transition metal elements other than Co, Mn and Ni, $0.9 \le p \le 1.1$, $0.2 \le x \le 0.5$, $0.2 \le y \le 0.5$, $0.1 \le z \le 0.4$, $0 \le q \le 0.5$, $1.9 \le a \le 2.1$, $p+x+y+z+q=2$, and $0 \le a \le 0.02$,
   characterized in that when the powder is classified into small particle size-classified particles with an average particle size of $2 \mu m \le D_{50} \le 8 \mu m$ and large particle size-classified particles with an average particle size of $10 \mu m \le D_{50} \le 75 \mu m$,
   a ratio of % by weight of the small particle size-classified particles compared to a % by weight of the large particle size-classified particles is from 15/85 to 40/60,
   a molar ratio ps of lithium to the total of nickel, cobalt, manganese and the M element contained in the small particle size-classified particles is smaller than a molar ratio pl of lithium to the total of nickel, cobalt, manganese and the M element contained in the large particle size-classified particles and wherein $0.95 \le ps \le 1.04$, $1.03 \le pl \le 1.12$, $0.85 < ps/pl < 1$.

2. The lithium/nickel/cobalt/manganese-containing composite oxide powder according to claim 1, wherein the specific surface area of the lithium/nickel/cobalt/manganese-containing composite oxide powder is from 0.2 to 1.0 $m^2/g$, the specific surface area of the small particle size-classified particles is from 0.5 to 2.0 $m^2/g$, and the specific surface area of the large particle size-classified particles is from 0.1 to 0.5 $m^2/g$.

3. The lithium/nickel/cobalt/manganese-containing composite oxide powder according to claim 1, wherein M is at least one element selected from the group consisting of Al, Zr, Ti, Hf, Nb, Ta, Mg, Ge, Sn and Zn.

4. The lithium/nickel/cobalt/manganese-containing composite oxide powder according to claim 1, wherein the amount of free alkalis is at most 0.40 mol %.

5. A positive electrode for a lithium secondary battery comprising a cathode active material, a binder and an electroconductive material, wherein the cathode active material comprises the lithium/nickel/cobalt/manganese-containing composite oxide powder as defined in claim 1.

6. A lithium secondary battery comprising a positive electrode, a negative electrode, a non-aqueous electrolyte and an electrolytic solution, wherein the positive electrode is the one as defined in claim 5.

7. A lithium/nickel/cobalt/manganese composite oxide powder having the formula $Li_pNi_xCo_yMn_zM_qO_{2-a}F_a$, wherein M is at least one element selected from the group consisting of Al, Ge, Sn, an alkaline earth metal element and a transition metal element other than Co, Mn and Ni,
   wherein $0.9 \le p \le 1.1$, $0.2 \le x \le 0.5$, $0.2 \le y \le 0.5$, $0.1 \le z \le 0.4$, $0 \le q \le 0.05$, $1.9 \le 2-a \le 2.1$, $p+x+y+z+q=2$, and $0 \le a \le 0.02$,
   wherein the composite oxide powder comprises a small particle size particle having an average particle size of $2 \mu m \le D_{50} \le 8 \mu m$ and a large particle size particle having an average particle size of $10 \mu m \le D_{50} \le 25 \mu m$,
   wherein the weight percent ratio of the small particle size particle to the large particle size particle is from 15/85 to 40/60, and
   wherein the molar ratio of Li to the total molar amount of Ni, Co, Mn and the M element in the small size particle is less than the molar ratio of Li to the total molar amount of Ni, Co, Mn and the M element in the large particle.

8. The lithium/nickel/cobalt/manganese composite oxide powder according to claim 7, wherein, a molar ratio ps of lithium to the total of nickel, cobalt, manganese and the M element contained in the small particle size-classified particles is smaller than a molar ratio pl of lithium to the total of nickel, cobalt, manganese and the M element contained in the large particle size-classified particles wherein $0.95 \le ps \le 1.04$, $1.03 \le pl \le 1.12$, $0.85 < ps/pl < 1$.

9. The lithium/nickel/cobalt/manganese-containing composite oxide powder according to claim 7, wherein the specific surface area of the lithium/nickel/cobalt/manganese-containing composite oxide powder is from 0.2 to 1.0 $m^2/g$, the specific surface area of the small particle size-classified particles is from 0.5 to 2.0 $m^2/g$, and the specific surface area of the large particle size-classified particles is from 0.1 to 0.5 $m^2/g$.

10. The lithium/nickel/cobalt/manganese-containing composite oxide powder according to claim 7, wherein M is at least one element selected from the group consisting of Al, Zr, Ti, Hf, Nb, Ta, Mg, Ge, Sn and Zn.

11. The lithium/nickel/cobalt/manganese-containing composite oxide powder according to claim 7, wherein the amount of free alkalis is at most 0.40 mol %.

12. A positive electrode for a lithium secondary battery comprising a cathode active material, a binder and an electroconductive material, wherein the cathode active material comprises the lithium/nickel/cobalt/manganese-containing composite oxide powder as defined in claim 7.

13. A lithium secondary battery comprising a positive electrode, a negative electrode, a non-aqueous electrolyte and an electrolytic solution, wherein the positive electrode is the one as defined in claim 12.

14. The lithium/nickel/cobalt/manganese-containing composite oxide powder according to claim 1, wherein the small particle size-classified particles have an average particle size of $3.1 \mu m \le D_{50} \le 8 \mu m$.

15. The lithium/nickel/cobalt/manganese-containing composite oxide powder according to claim 1, wherein the small particle size-classified particles have an average particle size of $3.5 \mu m \le D_{50} \le 8 \mu m$.

16. The lithium/nickel/cobalt/manganese-containing composite oxide powder according to claim 1, wherein the small particle size-classified particles have an average particle size of $4 \mu m \le D_{50} \le 8 \mu m$.

17. The lithium/nickel/cobalt/manganese-containing composite oxide powder according to claim 1, wherein the small particle size-classified particles and the large particle size-classified particles comprise the same elements.

18. The lithium/nickel/cobalt/manganese-containing composite oxide powder according to claim 7, wherein the small particle size-classified particles have an average particle size of $3.1 \mu m \le D_{50} \le 8 \mu m$.

19. The lithium/nickel/cobalt/manganese-containing composite oxide powder according to claim 7, wherein the small particle size-classified particles have an average particle size of $3.5 \mu m \le D_{50} \le 8 \mu m$.

20. The lithium/nickel/cobalt/manganese-containing composite oxide powder according to claim 7, wherein the small particle size-classified particles have an average particle size of $4\ \mu m \leq D_{50} \leq 8\ \mu m$.

21. The lithium/nickel/cobalt/manganese-containing composite oxide powder according to claim 7, wherein the small particle size-classified particles and the large particle size-classified particles comprise the same elements.

* * * * *